US007575363B2

(12) United States Patent
Ruser et al.

(10) Patent No.: US 7,575,363 B2
(45) Date of Patent: Aug. 18, 2009

(54) APPARATUS FOR SHAKING SAMPLE CONTAINERS

(75) Inventors: Oliver Ruser, Hamburg (DE); Holger Link, Hamburg (DE)

(73) Assignee: Eppendorf AG, Hamburg (DE)

( * ) Notice: Subject to any disclaimer, the term of this patent is extended or adjusted under 35 U.S.C. 154(b) by 450 days.

(21) Appl. No.: 11/566,873

(22) Filed: Dec. 5, 2006

(65) Prior Publication Data

US 2007/0125186 A1 Jun. 7, 2007

(30) Foreign Application Priority Data

Dec. 7, 2005 (DE) ....................... 10 2005 058 606

(51) Int. Cl.
*G01F 15/00* (2006.01)

(52) U.S. Cl. ...................................................... 366/140

(58) Field of Classification Search .................. 366/140
See application file for complete search history.

(56) References Cited

U.S. PATENT DOCUMENTS 3,850,580 A * 11/1974 Moore et al. .................. 422/99
4,555,183 A * 11/1985 Thomas ...................... 366/208
5,795,061 A * 8/1998 Perlman ..................... 366/130

FOREIGN PATENT DOCUMENTS

DE 29700725 U1 5/1998
WO 2005094977 A1 10/2005

OTHER PUBLICATIONS neoLab. Hauptkatalog 2001/2002, pp. 6.030, 6.031.
Roth Gesamtkatalog 2005, pp. 628, 629.

* cited by examiner

*Primary Examiner*—Robert R Raevis
(74) *Attorney, Agent, or Firm*—Rankin, Hill & Clark LLP

(57) ABSTRACT

An apparatus for shaking individual sample containers including an upper end with an opening and a lower closed end, the apparatus including a holder with which the sample container can, with its lower end, be brought into engagement such that, when the holder moves, the lower end of the sample container is also moved; a drive connected to the holder and moving the holder for shaking the sample container in a, particularly, horizontal plane; a sensor which, once a sample container is arranged at a defined position in the holder, generates a start signal and, once the sample container is removed from the defined position in the holder, generates a stop signal for the drive, wherein the drive is designed such that it continues to move the holder for a defined coast-down time after a stop signal has been generated by the sensor.

7 Claims, 3 Drawing Sheets

APPARATUS FOR SHAKING SAMPLE CONTAINERS

BACKGROUND OF THE INVENTION

1. Field of the Invention

The invention relates to an apparatus for shaking sample containers.

2. Description of Related Art

Traditionally, generic apparatus are referred to as vortex mixers. Such mixers can be used for shaking a sample container, and in particular a test tube or centrifuge glass tube for example, which is normally held at its upper end by the operator.

Generic apparatus comprise a drive which is able to move a holder provided on the upper side of the mixer at high frequencies, for example on a narrow circular path or another path that is suitable for mixing.

The holder is designed such that the traditional sample containers, such as test tubes or centrifuge glass tubes, can, with their closed lower end, be arranged therein or thereon in such a manner that the movement of the holder is transmitted to the container.

Generic assemblies are, in particular, used in microbiological laboratories or cell laboratories. A frequent application is the resuspension of pelletized cells, which is only one example. Particularly in this case, the vortex developing in the vessel during mixing ensures that the pellets which can, otherwise, be detached from the wall with difficulty only can be brought in solution again. However, it is also possible to contemplate other applications where it is intended to dissolve solid components or to mix fluids with one another.

To facilitate operation, traditional apparatus provide that the mixing process starts automatically as soon as a sample container, for example a test tube or a centrifuge glass tube, is arranged at a defined position in the holder.

To achieve this, some apparatus comprise on their upper side an optical sensor which detects the presence of, for example, a test tube in the holder and then automatically generates a start signal for the drive. Other apparatus provide a pressure sensor. In this case, the holder must be pressed down by the vessel to be shaken, wherein a start signal is triggered for the drive once the container or the holder pressurized by this container is in a defined position. Accordingly, a stop signal is generated once, in the former case, the test tube is removed out of the range of the optical sensor or, in the latter case, once the holder is unloaded, wherein the mixing process stops instantly in generic apparatus.

Known sensor-controlled assemblies are disadvantageous in that the mixing process is, in an undesired manner, interrupted even if, for example, the sample container is repositioned in the holder or the vessels to be mixed are exchanged.

BRIEF SUMMARY OF THE INVENTION

The invention aims at creating an apparatus which obviates the drawbacks disclosed.

As a matter of principle, the apparatus according to the invention corresponds to the generic apparatus described above. In contrast thereto, however, it is provided that the drive does not stop instantly after generation of the stop signal but that the holder continues to be moving at mixing speed for a defined coast-down time.

The coast-down time can be defined in relation to the specific device or application. Usually, it is dimensioned such that it allows, for example, a replacement of sample containers in the holder or a new positioning or repositioning of the container while the mixing process is in progress without a stop of the drive. As a general rule, coast-down times ranging from one to ten seconds, and in particular from two to five seconds, are appropriate for the majority of laboratory applications.

The apparatus according to the invention provides a number of advantages. As is the case with generic assemblies, it can be started and stopped under the control of a sensor if no further mixing process is intended. Here, the coast-down time does not have any disturbing effect because the drive stops relatively quickly, even in the apparatus according to the invention. If, however, a further mixing process is intended and a sample container is removed from the holder for a short period of time or is replaced by another one, the mixing process can be continued without any interruption within the coast-down time after a new sample vessel has been arranged in the holder and a new start signal has been generated. This facilitates operation in a decisive manner since the stop and restart of the drive incurred with generic apparatus are no longer applicable in the situations described.

In addition to the aforementioned generic sensor-controlled apparatus, there are also known non-generic apparatus which can be turned on and off by means of a separate switch. Such apparatus can be used for continuous mixing. They are disadvantageous in that their operation becomes complicated through the actuation of a separate switch.

The apparatus according to the invention combines the advantages of both known mixers. In other words, the apparatus according to the invention also allows adjustment of continuous operation of sorts without the operator having to actuate a separate switch, at least if he or she works with great skill.

Advantageous embodiments of the invention are specified in the subordinate claims.

Particularly appropriate coast-down times range from 1 to 10 seconds, more particularly from two to five seconds. This time interval has proved to be sufficiently long for overriding the interruptions in the mixing process usually occurring during operation, for example when a container is exchanged or repositioned.

For successful mixing, it is essential that the holder is preferrably circulating on a circular path that is as ideal as possible and at a uniformly high angular speed, with the circular path preferrably extending in a horizontal plane.

Particularly preferred circulation speeds range from 3000 to 3500 revolutions per minute (rpm). Preferrably, the radius of the circular path may, for example, be 1.5 mm. It is, of course, also possible to contemplate other radii or other paths for moving the holder, provided it is ensured that mixing in the sample container is reliably effected with an appropriate movement of the holder.

In particular, the apparatus according to the invention is operated at a circulation speed or frequency within a range of 3500 rpm.

BRIEF DESCRIPTION OF THE DRAWINGS

Below, the invention will be illustrated in more detail by means of three figures. In the figures.

DETAILED DESCRIPTION OF THE INVENTION

Figure 1:
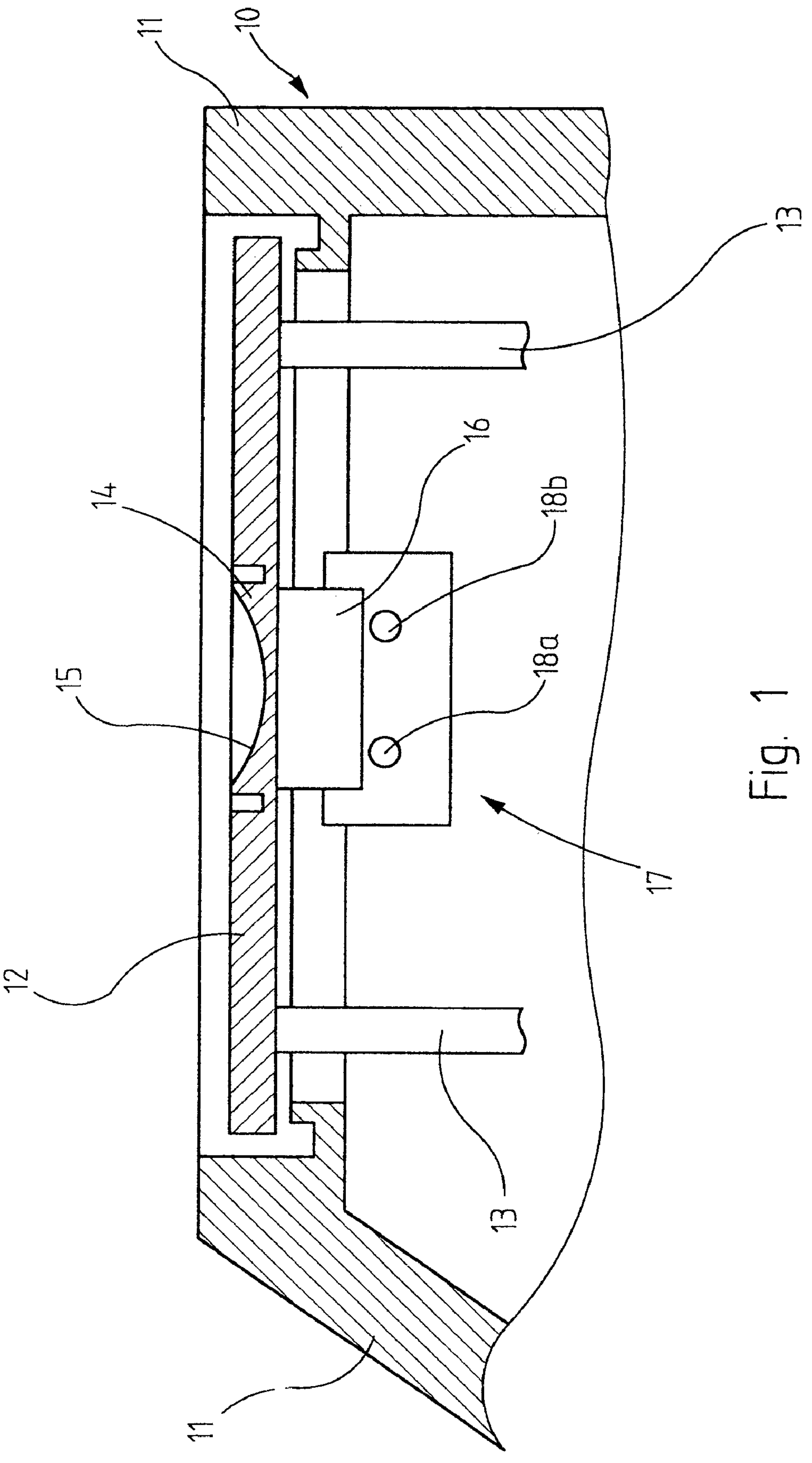
FIG. 1 is a partial sectional view of the upper region of an embodiment of the apparatus according to the invention.

FIG. 1 shows a detail of an apparatus 10, comprising a housing 11 with an oscillating plate 12 being provided in the upper region of said housing 11. Through rods 13, the oscillating plate 12 is coupled to an eccentric drive (not shown) which, during operation, drives the plate 12 on a plane constant circular path, for example, at a circulation speed of 3500 rpm. A holder 14 for sample vessels is provided in the central region of said oscillating plate.

Figure 2:
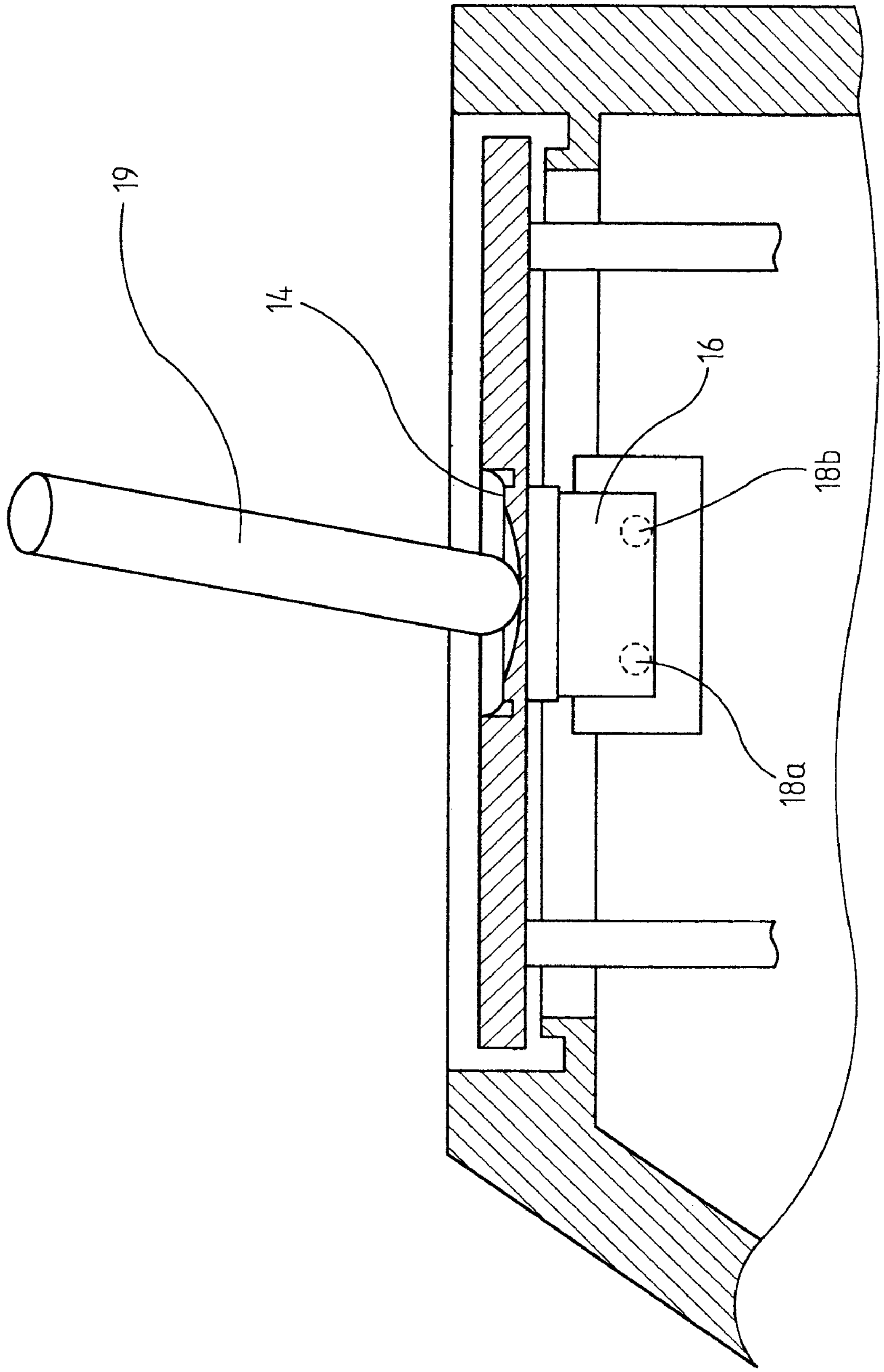
FIG. 2 is an identical view of the apparatus shown in FIG. 1, including a test tube.

In the illustrated instance, the holder 14 comprises a recess 15 intended to protect a test tube 19, as shown in FIG. 2, from slipping away to the side. It is, however, also possible to contemplate a holder without a recess which must, however, then be formed of a material also precluding a slipping away of vessels.

A cover plate 16 pointing in a downward direction is provided on the holder 14. In the direction of movement and underneath the cover plate 16, a photoelectric beam detector 17, in the illustrating instance comprising two optical sensors 18*a* and 18*b*, is provided in the apparatus 10.

As can be seen from FIG. 2, the holder region 14 can be pressed down when a reaction vessel 19 is inserted, wherein the cover plate 16 will then enter into the light path in front of the sensors 18*a* and 18*b*, triggering a start signal for the drive (not shown).

Such a sensor construction or a similar sensor construction can be used to define on-points (a start signal is generated) and off-points (a stop signal is generated) in a simple manner. For example, the points can each be assigned to a specific light intensity or light quantity measured by the sensors. It is to particular advantage if the points are defined differently, for example by assigning them to different press-in depths. It is, for example, conceivable that a start signal is not triggered before the cover plate has been pressed down to a relatively deep position and the stop signal is triggered at a higher position. The hysteresis thus generated clearly facilitates handling of the apparatus.

As a matter of course, it is also possible to utilize other sensor assemblies enabling hysteresis, such as proximity switches or pressure sensors or the like.

Therein, the invention is not restricted to assemblies which enable hysteresis. As a matter of principle, all of the sensor assemblies which generate a start signal once a sample container is arranged at a defined position in the holder and a stop signal once the sample container has been removed from a defined position can be provided in conjunction with the apparatus according to the invention. The formulation—arrangement of a sample container at a defined position in the holder and removal of the sample container from such a position—naturally also comprises the fact that, as has been described above, the holder is moved by the positioning of the sample container and a start or stop signal respectively is triggered when the holder or components connected thereto have reached defined positions.

In the aforementioned manner, a start signal for the drive (not shown) is generated with the holder in the defined position, whereupon said drive starts to move the oscillating plate 12 on its circular path. The radius of this circular path is relatively small. Usually, it ranges from one millimeter to no more than 1 to 2 cm. Once the mixing speed has been reached, the holder 14 transmits a high-frequency shaking movement to the reaction vessel 19, said movement then ensuring thorough mixing.

The holder region 14 is designed to be resilient. Once the reaction vessel 19 is removed from its defined depressed position, the cover plate 16 returns to the region outside of the sensors 18*a* and 18*b*. In this position, a stop signal is generated, said stop signal causing the drive to stop instantly in traditional devices.

In contrast thereto, the apparatus according to the invention provides that the drive, after generation of a stop signal, still coasts down at mixing speed for a specific time period. While the coast-down time elapses, a new start signal can be generated at any time by pressing down the cover plate 16, with the result that the mixing process is continued until the next stop signal is generated and the subsequent coast-down time has elapsed completely.

Figure 3:
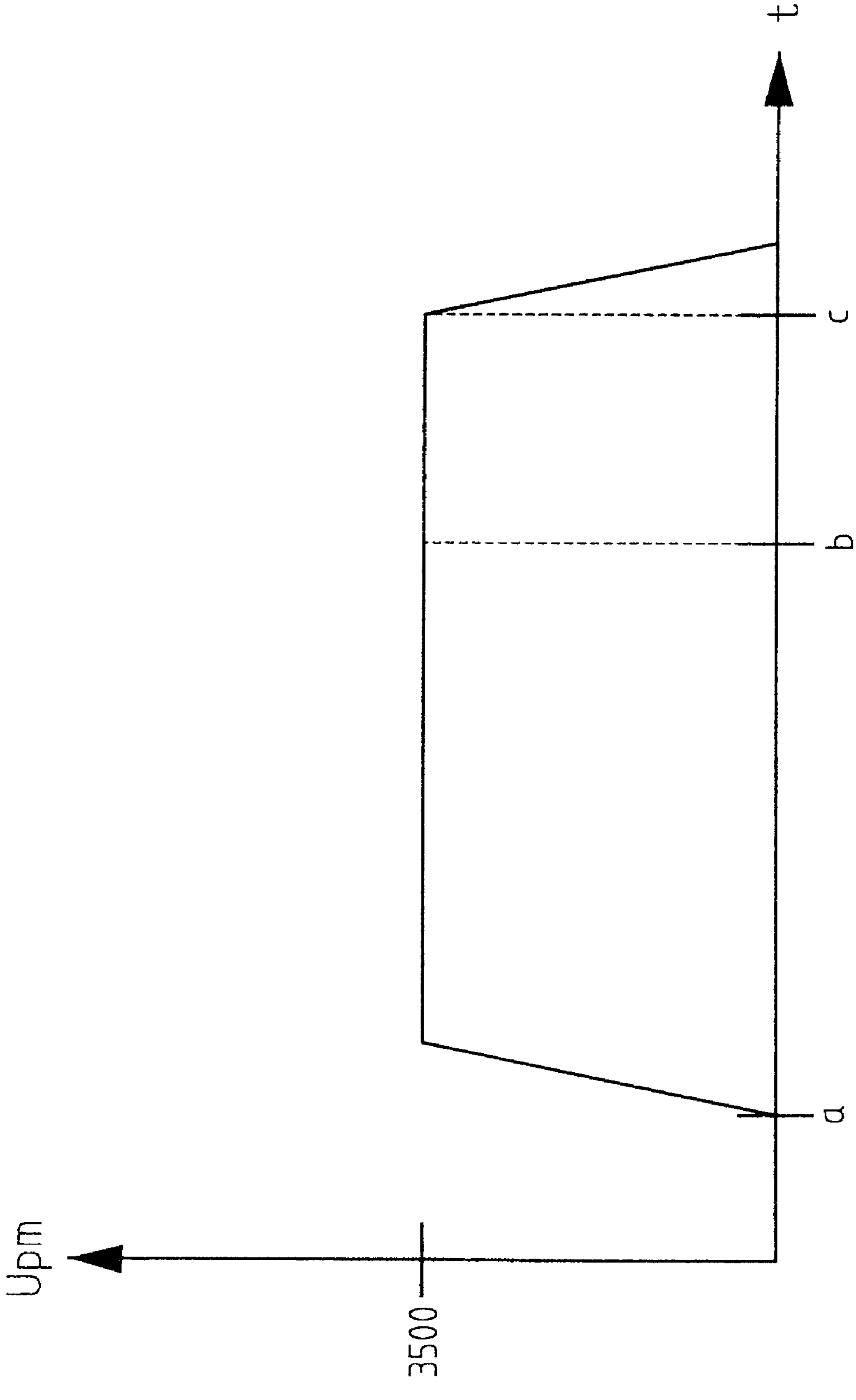
FIG. 3 is a graphical view of the progress of the mixing process.

FIG. 3 shows a typical mixing process in the form of a curve where the number of revolutions is plotted against the time. By pressing down the cover plate 16 de-scribed in FIGS. 1 and 2, a start signal is triggered at time a, thus starting the mixer and relatively quickly accelerating it to an operating speed of, for example, 3500 rpm. This speed will then be kept at a constant level even after a stop signal has been generated at time b. Once the stop signal has been generated, the coast-down time provided according to the invention elapses wherein, during said coast-down time, the drive of the apparatus according to the invention continues to drive the holder at undiminished speed, irrespective of whether or not a vessel is arranged in the holder.

After the coast-down time has elapsed completely and provided no further start signal has been generated, the drive stops at time c and the speed resets to 0.

The invention claimed is:

1. An apparatus for shaking individual sample containers comprising an upper end with an opening and a lower closed end, said apparatus comprising:

- a holder with which the sample container can, with its lower end, be brought into engagement such that, when the holder is moved, said lower end of the sample container is also moved,
- a drive connected to the holder and moving the holder for shaking the sample container in a, particularly, horizontal plane, and
- a detector which, once a sample container is arranged at a defined position in the holder, generates a start signal and, once the sample container is removed from a defined position in the holder, generates a stop signal for the drive, wherein the drive is designed such that it continues to move the holder (14) for a defined coast-down time after a stop signal has been generated by the detector (18*a*, 18*b*).

2. The apparatus according to claim 1, wherein the coast-down time is dimensioned such that, in continuous operation, it is possible to remove a sample vessel (19) from the holder (14) and to arrange a new sample vessel at the defined position in the holder (14) during the coast-down time.

3. The apparatus according to claim 2, wherein the coast-down time ranges from 1 to 10 seconds.

4. The apparatus according to claim 1, wherein the drive moves the holder on a, particularly, horizontal circular path.

5. The apparatus according to claim 4, wherein the radius of the circular path ranges from 1 mm to 20 mm.

6. The apparatus according to claim 4, wherein the speed ranges from 3000 to 3500 revolutions per minute.

7. The apparatus according to claim 1, wherein the detector generates the start signal once the sample container is arranged at a defined position in the holder and generates the stop signal once the sample container is removed from a different defined position in the holder.

* * * * *